United States Patent [19]

Birt et al.

[11] 4,277,071

[45] Jul. 7, 1981

[54] DISC RECORDS HAVING SURFACE MARKINGS

[75] Inventors: David E. Birt, Hanwell; Lyn Holt, Maidenhead, both of England

[73] Assignee: E M I Limited, Hayes, England

[21] Appl. No.: 878,872

[22] Filed: Feb. 17, 1978

[30] Foreign Application Priority Data

Feb. 18, 1977 [GB] United Kingdom ................. 6845/77

[51] Int. Cl.$^3$ ............................................... G11B 3/84
[52] U.S. Cl. ..................................... 369/84; 264/107; 369/272
[58] Field of Search ................. 274/42 R, 42 P, 41 R; 264/106, 107

[56] References Cited

U.S. PATENT DOCUMENTS

| | | | |
|---|---|---|---|
| 1,033,909 | 7/1912 | Owen | 274/42 P |
| 1,477,117 | 12/1923 | Gleason | 274/42 P |
| 3,247,298 | 4/1966 | Utiger | 264/107 |
| 4,066,268 | 1/1978 | Borchard et al. | 274/42 R |
| 4,144,300 | 3/1979 | Breeden | 264/106 |

FOREIGN PATENT DOCUMENTS

| | | | |
|---|---|---|---|
| 317415 | 8/1929 | United Kingdom | 274/42 P |
| 326765 | 3/1930 | United Kingdom | 274/42 P |
| 800997 | 9/1958 | United Kingdom | 274/42 P |

*Primary Examiner*—Harry N. Haroian
*Attorney, Agent, or Firm*—Fleit & Jacobson

[57] ABSTRACT

A record having an information track cut into the surface and a visible pattern formed on surface "lands" bordering the track. The pattern is shallower than the track depth, typically 0.7 micron for a 25 micron sound microgroove record track. A method of providing the marking by applying solvent to a lacquer before cutting a master is described.

1 Claim, 3 Drawing Figures

DISC RECORDS HAVING SURFACE MARKINGS

This invention relates to the manufacture of disc records and the like articles replicated by pressing with a mould.

Disc records are replicated by introducing a mouldable material such as a plastic mixture based on vinyl between mould parts bearing the reverse of the surface form to be given to the disc and which forms the record of audio video or other information. Such records normally bear a paper label carrying information about the record and stuck at the centre of the recording surface. Other pressing techniques are known.

U.K. Patent Specification No. 1341049 to Nippon Victor K.K. discloses a technique for producing a synthetic moulded product, such as a disc record, having a label equivalent portion moulded as a pattern of lustrous and lustreless parts of the surface. The pattern has an overall depth of between 10 and 100 microns with some components typically 3 microns deep, in the range of 1 to 5 microns. The pattern is produced by pressing a heated die into the central, label, portion of a lacquer master disc (that part not used for cutting a record groove) so that stampers electroformed therefrom produce the central label and the record groove at a single pressing step. Typically the groove on a vinyl plastics 33⅓ rpm 300 mm audio disc record is a few tens of microns, say 25 microns or more, in depth, (25 microns is 0.025 mm or 0.001 inch).

It is an object of the present invention to provide a technique of providing visible markings on records which is effective over the part bearing a record track.

According to the invention there is provided a record bearing a distinctive visible surface marking and an information record track, wherein the said marking comprises indentations in the surface of said record, a part at least thereof being applied in a region of the information record track, and the depth to which said record track is cut is substantially uniform with respect to the median plane of the record and is greater than the depth of the indentations.

The record may be formed by moulding the information track and marking in a body of plastic material. According to the invention, there is also provided a method of making a disc record having a distinctive surface marking including the steps of:

providing a blank lacquer surface, providing a pattern for forming the said distinctive surface marking, applying a marking fluid to the pattern and impressing the surface of the lacquer therewith to a depth less than the depth to which recorded information is cut into the lacquer, causing or allowing the removal of the fluid, cutting such information to be recorded into the lacquer surface, electroplating the cut lacquer surface to form a stamper and pressing therewith mouldable material into a disc record, In the drawings.

Figure 1:
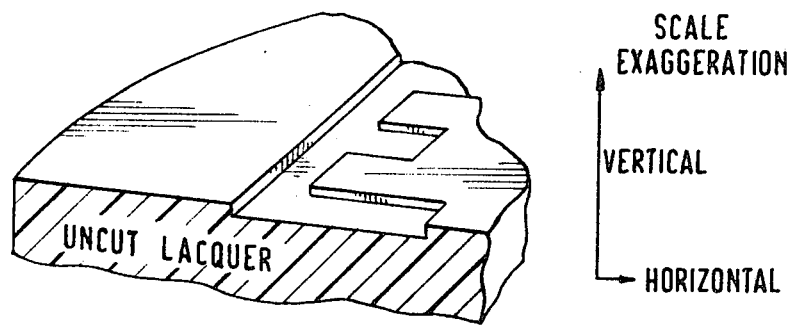
FIG. 1 is a perspective view partly in section showing an uncut lacquer.
Figure 2:
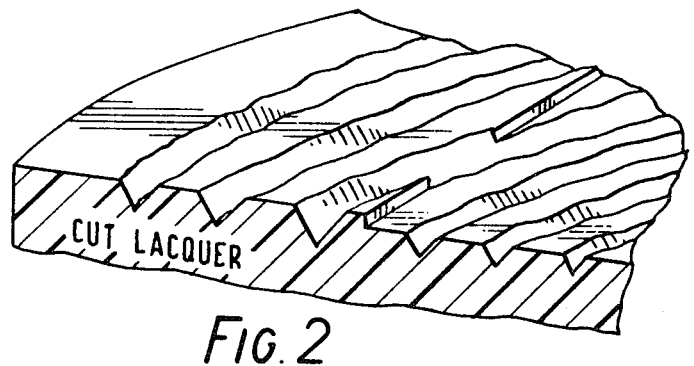
FIG. 2 is a similar view showing the cut lacquer.
Figure 3:
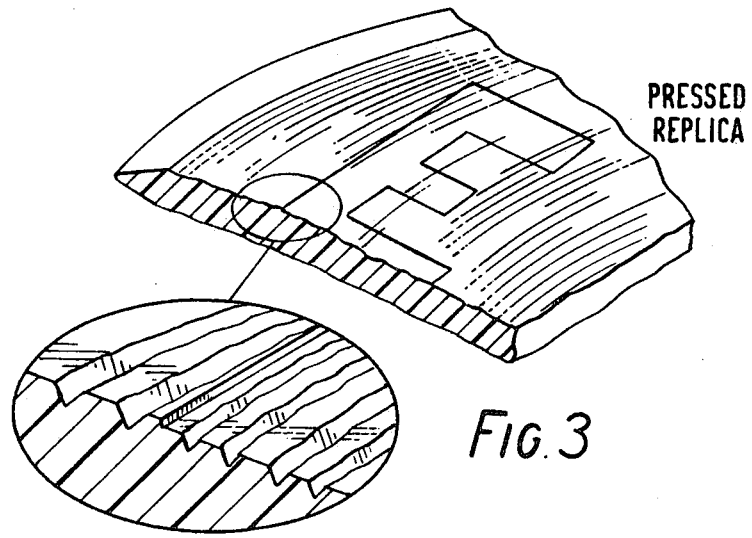
FIG. 3 is a similar view showing a pressed replica with an enlarged detail.

The pattern may be a silk screen or a printing block, which may be of rubber. The fluid may be a volatile solvent for the lacquer. The surface disturbance of the lacquer may be a layer of additional material or a roughening of the gloss finish.

Embodiments of the invention will now be described.

To make a disc record bearing a distinctive surface marking shallower than a surface deformation by which information is recorded a "lacquer" of conventional type is provided. A pattern such as a printing block, preferably resilient, e.g. rubber, or a silk screen is prepared of suitable size to cover a desired area of the surface of the lacquer. The pattern is any desired distinctive form such as a trade mark or picture, or may include details of the recorded information somewhat as on a conventional record label.

Using the pattern a marking fluid is applied to the "lacquer" surface to disturb it slightly in the pattern area. As the pattern area extends into the area of surface to be deformed by recording information the disturbance of the surface must be shallower than the recording deformation to avoid interference with the quality of the recording. The depth of deformation for recording varies with record material and speed and other factors but can be readily established by those skilled in the art. For example for 300 mm 33⅓ rpm audio discs the groove is at least 25 micron deep with a "land" of some 40 microns width between grooves. For such a groove format a depth of less than 1 micron for the marking is desirable to prevent the marking being audible. Preferably the depth is some 0.7 micron. Values in excess of these, such as some 5 microns, produce extremely loud signals on playing the record.

Suitable marking fluids are liquids such as methanol (e.g. as methylated spirits), butoxy ethanol or methylethyl ketone for use on a rubber printing block, and for use with a silk screen a nitrocellulose varnish such as that available from Coats Inks Limited as Cosol O/P varnish KP 7955. A gas acting through a cut-out mask may also be used. The fluids used with the printing block slightly dissolve the "lacquer" material, usually cellulose nitrate, and disturb the gloss finish, the fluids evaporate away quickly. The silk screen technique deposits a thin layer of vanish on top of the lacquer, the varnish solvents bonding it to the layer. In each case the lacquer is allowed to become dry and set before cutting is started.

The "lacquer" then has the information to be recorded cut into the surface, e.g. as a groove, in the usual way and the "lacquer" is plated to produce masters and thence stampers as is well known. The marking persists through these processes on the "lands" between adjacent grooves and is replicated in the finished disc with the recorded information. The marking is visible in the finished disc as a slightly different surface texture, which in some cases is best seen by looking obliquely rather than directly at the disc surface.

The marking can have several forms. For example a design or picture may be applied. The design or picture may be of the performers of the recorded sound, or it may be a trade mark or other indication of the origin of the disc record. Such an indication of origin, being durably incorporated during manufacture, could assist in reducing the "pirating" of the recorded information by distinguishing marked records from those not incorporating the mark. The marking could be only the "label" replacing the conventional printed label or both the label and a distinguishing mark.

The marking makes very little measurable change in the thickness of the record as it must be shallower than the minimum cutting depth, which is normally 0.025 to 0.05 mm, so as not to impair recording quality or generate "noise" or "clicks". A preferred value is up to 0.001 mm in depth.

A particular example is now described for a 300 mm lacquer master to be recorded with a microgroove sound record track. The lacquer master is prepared in the usual way. At any time after the lacquer is set the marking may be applied. A stamp having the desired form of the marking is made preferably from an oil-proof rubber material. A quantity of a slow-drying solvent such as the proprietary material "Cellosolve", is rolled out onto a glass plate, in a thin uniform film. Using a roller apply a thin uniform film of the solvent from the plate to the stamp. Press the coated stamp onto a lint free paper surface, such as brown, glazed, "Kraft" type paper. Care must be taken that the stamp does not slip while on the paper. This action reduces to a minimum the amount of solvent on the stamp. The stamp is now applied with a uniform pressure to the lacquer at the place where the pattern is desired. Application and removal of the stamp must be vertical without any slip. The lacquer is then allowed to dry for one hour at 50° C. in an air circulating oven. The lacquer is then cut and processed as usual for lacquer masters. The stamp may apply an overall design to the record surface with a single stamp action or a small design or mark may be applied in different places. This technique produces a marking some 0.7 micron deep in the master and finished replicated record.

Clearly other techniques to apply the solvent may be used for example a roller with engravings or embossings or a felt pen loaded with solvent for written or drawn markings such as a signature or character. It is essential that the depth of marking is small and that the lacquer is dry of solvent before cutting occurs. Formats other than grooves, e.g. a line of pits as used for video records, may also be used.

The techniques described above enable the replication of disc records bearing a distinct marking which is durable and does not impair the recording quality. In distinction from the technique of U.K. Patent Specification 1341049 which is to provide labels using a pattern as deep or deeper than a record groove the present technique permits the formation of a marking so shallow that no effect on the record groove occurs and the marking can therefore be on the recording area. Furthermore no particular lacquer treatment other than a simple stamping action with a rubber stamp is required. In distinction from the markings some 3 micron deep of U.K. Patent Specification 1341049, described as extremely minute, the present invention provides markings of less than 1 micron in depth.

What we claim is:

1. A method of making a disc record having a distinctive surface marking including the steps of:

providing a blank lacquer surface, providing a pattern for forming the said distinctive surface marking, applying a marking fluid to the pattern and impressing the surface of the lacquer therewith to a depth less than the depth to which recorded information is cut into the lacquer, causing or allowing the removal of the fluid, cutting such information to be recorded into the lacquer surface, electroplating the cut lacquer surface to form a stamper and pressing therewith mouldable material into a disc record.

* * * * *